United States Patent
Obaidi et al.

(10) Patent No.: US 11,375,378 B2
(45) Date of Patent: Jun. 28, 2022

(54) WIRELESS CARRIER NETWORK-ENABLED PROTECTION OF HIGH VALUE DATA

(71) Applicant: T-Mobile USA, Inc., Bellevue, WA (US)

(72) Inventors: Ahmad Arash Obaidi, Issaquah, WA (US); Eric Yocam, Sammamish, WA (US); Paul Farag, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 160 days.

(21) Appl. No.: 16/675,089

(22) Filed: Nov. 5, 2019

(65) Prior Publication Data

US 2021/0136569 A1 May 6, 2021

(51) Int. Cl.
*H04W 12/37* (2021.01)
*G06F 21/62* (2013.01)
*G06F 16/23* (2019.01)
*H04W 12/71* (2021.01)

(52) U.S. Cl.
CPC ........ *H04W 12/37* (2021.01); *G06F 16/2365* (2019.01); *G06F 21/6209* (2013.01); *H04W 12/71* (2021.01)

(58) Field of Classification Search
CPC ....... H04W 12/0027; H04W 12/00512; H04W 12/37; H04W 12/71; G06F 16/2365; G06F 16/6209
See application file for complete search history.

(56) References Cited

U.S. PATENT DOCUMENTS

| | | | |
|---|---|---|---|
| 2010/0299315 A1* | 11/2010 | Gosnell | H04L 63/061 707/698 |
| 2016/0072796 A1* | 3/2016 | Adam | H04L 63/20 713/159 |
| 2017/0201850 A1* | 7/2017 | Raleigh | H04W 4/50 |
| 2021/0168705 A1* | 6/2021 | Fiorese | H04W 48/18 |

* cited by examiner

Primary Examiner — Ashokkumar B Patel
Assistant Examiner — William B Jones
(74) Attorney, Agent, or Firm — Han Santos, PLLC

(57) ABSTRACT

A request from a user device to register as a secure endpoint device of a secure local area network (LAN) is received by a wireless carrier network. A device type of the user device is identified by the network based on device identification information provided by the user device. A data protection policy that corresponds to the device type of the user device is sent to a secure endpoint application on the user device following a registration of the user device as a secure endpoint device by the network, in which the data protection policy includes an Access Point Name (APN). The user device allocated a network slice of the wireless carrier network that corresponds to the APN to the user device. Subsequently, a data file is transported from the user device to an additional secure endpoint device via the network slice that is allocated to the user device.

20 Claims, 8 Drawing Sheets

WIRELESS CARRIER NETWORK-ENABLED PROTECTION OF HIGH VALUE DATA

BACKGROUND

Protection of sensitive private data from unwanted access and use is a significant concern for consumers as well as service providers. As consumers expose more and more of their personal information to online service providers and Internet-of-Things (IoT) devices become more prevalent, it becomes ever easier for entities to stitch together digital information relevant to a consumer to construct a digital identity profile of the consumer. For example, a consumer may provide geolocation data to a map service provider, personal health and exercise data to a fitness tracking service, and financial information to an online financial management service. Further, IoT devices, such as public and private closed-circuit television cameras (CCTVs), automated toll sensors, automated ticketing sensors, may also generate and store information about the habits of a consumer. In some instances, sensitive private data may also be susceptible to interception or copying as the data is transported over various types of networks. Some malicious actors may use such data to construct digital identity profiles of consumers to engage in illegal activities such as identity theft or financial fraud.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
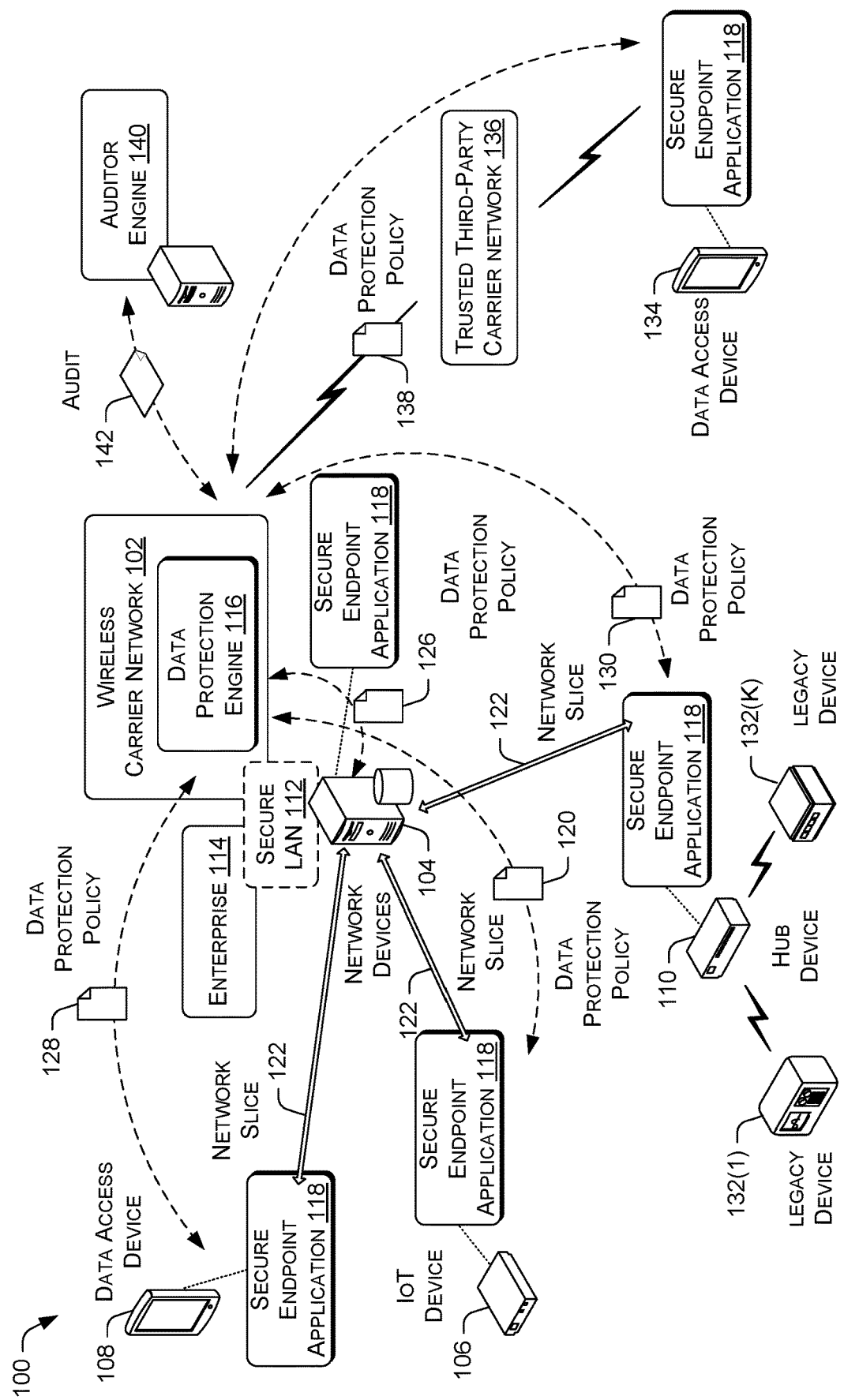
FIG. 1 illustrates an example architecture for a wireless carrier network to implement data protection policies and services to protect sensitive user data.

This disclosure is directed to techniques that enable a mobile network operator (MNO) of a wireless carrier network to use network slicing technology and a data protection engine to safeguard the high value data of users. Network slicing is the concept of allocating wireless communication network infrastructure components of the wireless carrier network to create virtual networks that handle communications for specific types of devices. In various instances, the wireless carrier network may be a 5G wireless carrier network or a wireless carrier network that conforms to some other wireless communication standards. In various embodiments, the data protection engine may allocate various network slices to different types of data that are transported by the wireless carrier network. The types of data may be specified based on the ownership of the data, the sensitivity level of the data, storage and access restrictions placed on the data, and/or other factors.

In various embodiments, a user device that uses the wireless carrier network may identify itself to the data protection engine of the wireless carrier network. In turn, the data protection engine may assign a data protection policy to the user device based on the type of data handled by the user device. The data protection policy may be a policy that is developed by a customer of the MNO who deployed the user device, by the MNO for the customer, or jointly developed by the customer and the MNO. For example, the data type may include personal financial data, privileged healthcare data, business/industry proprietary data, confidential government data, Internet-of-Things IoT communication data, and/or so forth. The data protection policy may configure the user device to use a particular network slice of the wireless carrier network to exchange data with other user devices. For example, a user device in a hospital setting may be qualified to use a particular network slice that meets certain priority and security parameters because the user device handles privileged healthcare data.

In exchange for being permitted to use the particular network slice, the data protection policy may enforce specific rules with respect to the handling of data by the user device. The data may include data files that are generated by the user device, transported by the user device, and received by the user device. In various embodiments, a secure endpoint application installed on the user device is responsible for implementing the data protection policy. For example, these rules may specify that data files stored on the user device are to self-encrypt after a certain time period, restrict the user device to sending the data files to authorized user devices of specific types, mandate that the user device encrypts data files prior to delivering them to the authorized user devices, comply with requests from other user devices to virtually delete the data files by encrypting the data files with encryption keys that are subsequently rendered irretrievable, and/or so forth. The rules may also mandate that the user device jointly track the data transactions (e.g., creating, accessing, receiving, sending, delete, etc.) that are performed on the data files with other user devices using a decentralized distributed ledger.

The techniques may enable an MNO to safeguard the integrity of data that are transported through the wireless carrier network, as well as provide an end-to-end solution that assists a customer with tracking and controlling the distribution of customer data at the network endpoints. In this way, rather than merely acting as a communication conduit for the data, the MNO may play a key role in protecting the data of customers from unauthorized access and use during the entire life cycle of the data. The techniques described herein may be implemented in a number of ways. Example implementations are provided below with reference to the following figures.

Example Architecture

FIG. 1 illustrates an example architecture for a wireless carrier network to implement data protection policies and services to protect sensitive user data. The wireless carrier network 102 of an MNO may provide a wide range of mobile communication services, as well as ancillary services and features, to subscribers and associated mobile device users. The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network by a wide area network (WAN). Each regional portion of the wireless carrier network 102 may include one or more RANs and a regional circuit and/or packet-switched network and associated signaling network facilities. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5G, 6G, and/or so forth. In some embodiments, the core network of the wireless carrier network 102 may be accessed via wired or wireless local area networks (LANs). For example, a wireless local area network may be a network that is established using Wi-Fi or Bluetooth standards and hardware.

In various embodiments, the wireless carrier network 102 may provide telecommunication services to subscriber devices, such as one or more network devices 104, an IoT device 106, a data access device 108, and a hub device 110. The user devices may be a part of a secure LAN 112 that is established by the wireless carrier network 102 for a customer, such as an enterprise 114. The secure LAN 112 may be established at a physical location of the customer, in which the networked devices in the secure LAN 112 may be wirelessly connected to the other network devices by the wireless communication infrastructure of the wireless carrier network 102. The wireless communication infrastructure may replace one or more existing network infrastructure components used by the enterprise 114. In a typical scenario, the one or more network devices 104 may include computing devices, network routers, data storage devices, printers, etc. The IoT device 106 may be a sensor device, a monitoring device, a portable measurement device, or any other wireless device that is designed to perform a set of specific functions. For example, in a scenario in which the secure LAN 112 is operated by a hospital, the IoT device 106 may be a heart rate monitor, a glucose meter, an intravenous drug delivery machine, a respirator apparatus, and/or so forth.

The data access device 108 may be an example of a user device that is used to either access data or input data into the secure LAN 112. In various embodiments, the data access device 108 may be a smartphone, a laptop computer, a tablet computer, and/or so forth. For example, in the above scenario of a hospital, the data access device 108 may be a smartphone that is used by a patient to access patient medical records of the patient from a data store located in a network device of the secure LAN 112.

The wireless carrier network 102 may be equipped with a data protection engine 116. The data protection engine 116 may be responsible for ensuring that each of the user devices within the secure LAN 112 or accessing the secure LAN 112 is equipped with a copy of the secure endpoint application 118. Once a user device is verified by the data protection engine 116 to have a copy of the secure endpoint application 118 installed, the data protection engine 116 may push a specific data protection policy to the user device based on a device type of the user device.

For example, the data protection engine 116 may receive a registration request from the IoT device 106 to register as a secure endpoint device, in which the registration request includes a device identifier of the IoT device 106. The IoT device 106 may send the registration request in response to a user activating the IoT device 106 to contact an online portal of the data protection engine 116. The online portal may be accessed by sending the registration request to a website or an Internet Protocol (IP) address. In some embodiments, the registration request may further include an authorization code that is distributed by the data protection engine 116. Accordingly, the data protection engine 116 may use the authorization code to determine that the IoT device 106 is authorized to register with the data protection engine 116 as a secure endpoint device. The device identifier may be an International Mobile Station Equipment Identity (IMEI), a Mobile Equipment Identifier (MEID), or some other electronic serial number (ESN) of the IoT device 106. In turn, the data protection engine 116 may compare the device identifier with a device identifier database to determine a device type of the user device. For example, the device type may indicate that the IoT device 106 is a medical device, a personal fitness tracker device, a home smart sensor device, etc.

Following the registration of the IoT device 106 as a secure endpoint device, the data protection engine 116 may retrieve a data protection policy 120 that corresponds to the device type from a data policy database and push the policy to the secure endpoint application 118 on the IoT device 106. In various embodiments, the data protection policy 120 may be a policy that is developed by the MNO for the customer, a policy that is developed by the customer and uploaded to the data policy database, or a policy that is jointly developed by the MNO and the customer. In various embodiments, the data protection policy may include an Access Point Name (APN) of a network gateway for the network slice assigned to the IoT device 106, such as the network slice 122. In instances in which the network slice 122 does not yet exist, the data protection engine 116 may instantiate the network slice 122 following the assignment of the network slice 122 to the IoT device 106. Accordingly, the IoT device 106 may use the APN to access the assigned network slice 122 to exchange data with other devices, such as the one or more network devices 104. For example, the IoT device 106 may use the network slice 122 to periodically transmit patient biometric data to a medical information data store of a network device 104. In some embodiments, the infrastructure components of the wireless carrier network 102 may provide data security services for the data transported by the network slice 122. Such data security service may include malware detection, virus detection, botnet traffic detection, denial-of-service (DoS) attack detection, and/or so forth.

The data protection policy 120 may further include rules with respect to the handling of data by the IoT device 106. The data may include data files that are generated by the user device, transported by the user device, and received by the user device. In various embodiments, the data files may contain high value information such as customer proprietary network information, personally identifiable information, financial data, biometric data, digital identity data, etc. The rules may configure a data file to self-encrypt at an expiration date and time, assign data storage and access restrictions to the data file, assign an ownership identifier to the data file, assign a data sensitivity level to the data file, mandate a level of data encryption for the data file, and/or so forth. The self-deletion may be accomplished using an encryption algorithm and an encryption key that is embedded in the data file. The data storage restrictions may specify whether the IoT device 106 is able to store data files in the memory of the IoT device 106. If so, the data storage restrictions may further specify the amount of time that the data files can be stored in the memory. Following the expiration of the time period, the IoT device 106 may virtually delete the data file by encrypting the data file with an encryption key that is then rendered irretrievable.

The data access restrictions may specify the types and/or identifiers of devices to which the IoT device 106 is authorized to send data files. Alternatively, or concurrently, the data access restrictions may specify the types and/or identifiers of devices from which the IoT device 106 is authorized to receive data files. Thus, if the IoT device 106 receives a data file from an unauthorized device, the IoT device 106 is mandated by the data access restrictions to perform a virtual deletion of the data file. In other instances, the data access restrictions may specify that the IoT device 106 is only authorized to send data files with one or more particular ownership identifiers specified in an outgoing authorization list to other devices. Alternatively, or currently, the data access restrictions may specify that the IoT device 106 is authorized to receive data files with one or more specific ownership identifiers specified in an incoming authorization list from other devices. Accordingly, if the IoT device 106 receives a data file with an ownership identifier that is not in the incoming authorization list, the IoT device 106 is mandated by the data access restrictions to perform a virtual deletion of the data file.

In other instances, the data access restrictions may specify a maximum sensitivity level for data files that the IoT device 106 is authorized to receive from other devices. Accordingly, the IoT device 106 is only able to receive data files that have sensitivity levels that are below or equal to the maximum sensitivity level. Hence, if the IoT device 106 receives a data file with a sensitivity level that exceeds the maximum sensitivity threshold, the IoT device 106 is mandated by the data access restrictions to perform a virtual deletion of the data file. Alternatively, or concurrently, the data access restrictions may specify that the IoT device 106 is only authorized to send data files having data sensitivity levels that are at or below a maximum sensitivity level to other devices.

The rules in a data protection policy may be tailored to the expected nature of the data generated or handled by the type of the user device. For example, an IoT device that is a part of a secure LAN that is operated by a particular entity may be required to label each data file generated by the IoT device with an ownership identifier of the particular entity. In another example, an IoT device in the form of a medical device that monitors the health characteristics of a patient may have a data protection policy that mandates a higher level of encryption for the data that the device generates that an IoT device that is merely a temperature sensor.

Thus, each of the devices that is a part of the secure LAN 112 or which exchanges data with other devices using the secure LAN 112 may be configured in a similar manner by the data protection engine 116. For example, the data protection engine 116 may ensure that a copy of the secure endpoint application 118 is installed on each of the one or more network devices 104, the data access device 108, and the hub device 110. Further, each of these devices may be equipped with a data protection policy that is tailored for each device by the data protection engine 116 in a similar manner as described with the IoT device 106. For example, each of the one or more network devices 104 may be provided with a data protection policy 126, the data access device 108 may be provided with the data protection policy 128, and the hub device 110 may be provided with a data protection policy 130. In exchange for implementing the data protection policies, each of these devices may be assigned a network slice for communicating with devices within the secure LAN 112. For example, each of the devices may be assigned to use the network slice 122. However, in other instances, at least one of the devices may be assigned a different network slice by the data protection engine 116.

The one or more network devices 104 may provide various data collection, data storage, data relay, data analysis, and data output capabilities. For example, a network device may analyze the data collected from various devices of the secure LAN 112 in order to generate reports and summaries for output to the data access device 108. For example, in the scenario of a hospital, the data access device 108 may be a patient device that is being used by a patient to access the medical records of the patient.

In some embodiments, the data protection policy 130 for the hub device 110 may be configured to enable the hub device 110 to exchange data with legacy devices 132(1)-132(K). Each of the legacy devices is a device that is capable of installing the secure endpoint application 118. For example, a legacy device may lack the processing, memory, or runtime environment resources to execute the secure endpoint application 118. However, the legacy device may nevertheless be a networked device with rudimentary remote command and online data reporting functionalities. In the scenario in which the secure LAN 112 is operated by a hospital, the legacy device may be a dialysis machine, an intravenous (IV) pump, a pacemaker, etc. Accordingly, the data protection policy 130 may have relaxed restrictions that enable the hub device 110 to exchange data with the legacy devices 132(1)-132(K) despite the shortcomings of the devices, such as the inability to execute a secure endpoint application, the absence of an ability to provide ownership identifier, sensitivity level, and/or data file encryption, etc. In such embodiments, the hub device 110 may establish an isolated network connection with each legacy device via an unlicensed communication link, such as Wi-Fi, Bluetooth, and/or so forth, without using the network infrastructure of the wireless carrier network 102. However, the hub device 110 may be equipped with a software firewall and/or a hardware firewall that prevents the legacy devices from requesting access to data stored on the other devices in the secure LAN 112.

In some embodiments, a data access device 134 that is using the wireless communication services provided by a trusted third-party carrier network 136 may be configured to access data files stored within the secure LAN 112. In such embodiments, the trusted third-party carrier network 136 may be providing telecommunication services in a geographical area unserved by the wireless carrier network 102. In other words, the data access device 134 may be a subscriber device of the wireless carrier network 102 that is roaming on the trusted third-party carrier network 136. The trusted third-party carrier network 136 may be operated by an MNO that has a trust relationship with the MNO of the wireless carrier network 102. Accordingly, the trusted third-party carrier network 136 may be trusted to distribute the secure endpoint application 118 and a corresponding data protection policy 138 to the data access device 134. Such distribution may occur when the data access device 134 sends a registration request to the data protection engine 116 of the wireless carrier network 102 via the trusted third-party carrier network 136. Subsequently, the data access device 134 may use the secure endpoint application 118 to exchange data with other devices of the secure LAN 112. In some instances, communication traffic of the data access device 134 may be partially carried by network infrastructures of the wireless carrier network 102 via a network slice that is assigned to the data access device 134 when traveling within the wireless carrier network 102.

In various embodiments, the secure endpoint application 118 installed on each of the devices 104-110 and 134 may function as a node of a decentralized distributed ledger. The decentralized distributed ledger uses blockchain technology to store data file transaction events. Blockchain technology refers to the use of a blockchain, or a continuously growing list of linked record entries, i.e., blocks, to store data. The linked record entries may be secured using cryptography such that each block contains a hash pointer that links the block to a previous block. Each block is configured to store transaction events and associated metadata, such as a timestamp, an identifier of the transaction, an event type of the transaction, and/or so forth. For the purpose of acting as a ledger of transactions, each record block in the blockchain may be stored and managed by a node in a peer-to-peer network. This means that it is not possible to retroactively alter the transaction data stored in any particular block of the blockchain without altering all subsequent blocks with the cooperation of a majority of the network peers in the peer-to-peer network. Accordingly, a blockchain can act as a decentralized distributed ledger for recording transactions in a verifiable and permanent manner. The data file transaction events for a data file may include a creation of the data, a transfer of the data file, an encryption of the data file, a decryption of the data file, a modification of the data file, a storage of the data file, a duplication of the data file, an access of the data file, a deletion of the data file, and/or so forth. Each transaction event record may include information such as a transaction identifier, a date and time of the transaction, an identifier of the transaction that is executed, the identifier for each of the one or more devices involved in the transaction, an identifier of the software used to perform the transaction, a result of the transaction (e.g., success, failure, retry, etc.).

The auditor engine 140 may audit the transaction event records stored in the decentralized distributed ledger to determine whether specific enterprise or governmental data retention policies are met. For example, the enterprise may have a data retention policy that requires data files to be retained for a predetermined time period of time and/or deleted after a particular period of time has elapsed. In another example, a governmental agency may request that the auditor engine 140 perform an audit 142 of the transaction event records to ensure that specific data files have been retained or deleted. In various embodiments, the auditor engine 140 may be a supernode of the decentralized distributed ledger that is operated by a trusted third-party. Alternatively, the auditor engine 140 may be operated by the wireless carrier network 102 as a part of the data protection engine 116.

In an additional example, a user may use a data access device, such as the data access device 108, to request a specific data file to be deleted from a data store of the secure LAN 112 In such an example, the auditor engine 140 may provide the data access device with one or more transaction event record entries showing that the data file has been virtually deleted following a deletion of the data file by the data protection engine 116. In a further example, a user may use the data access device to request an audit of access to a data file. Accordingly, the auditor engine 140 may provide the data access device with an access log for the data file. The access log may provide a date and time of each access, a device identifier of the device that provided the access, an identifier of the party that requested access, duration of the access, and/or so forth.

Example Secure Endpoint Device Components

Figure 2:
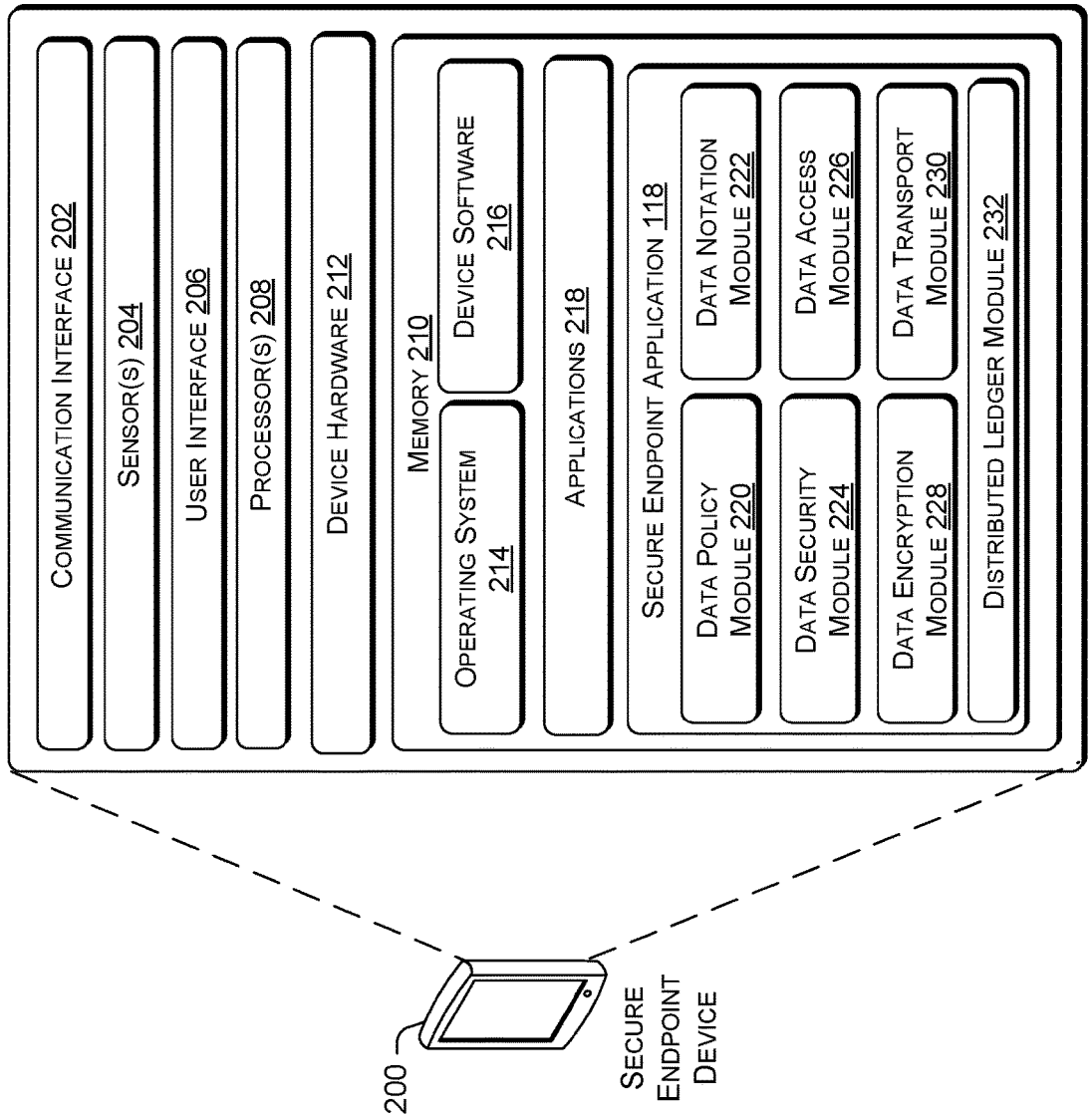
FIG. 2 is a block diagram showing various components of a secure endpoint device that interfaces with a data protection engine of a wireless carrier network that protects sensitive user data.

FIG. 2 is a block diagram showing various components of a secure endpoint device 200 that interfaces with a data protection engine of a wireless carrier network that protects sensitive user data. For example, the secure endpoint device 200 may be one of the devices 104-110 illustrated in FIG. 1. The secure endpoint device 200 may include a communication interface 202, one or more sensors 204, a user interface 206, one or more processors 208, memory 210, and device hardware 212. The communication interface 202 may include wireless and/or wired communication components that enable the secure endpoint device 200 to transmit or receive voice or data communication via the wireless carrier network 102, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate to the secure endpoint device 200. The compass, the accelerometer, and the GPS sensor may detect orientation, movement, and geolocation of the secure endpoint device 200. The cameras may capture images of the environment around the secure endpoint device 200.

The user interface 206 may enable a user to provide inputs and receive outputs from the secure endpoint device 200. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a modem that enables the secure endpoint device 200 to perform telecommunication and data communication with the wireless carrier network 102. The device hardware 212 may further include signal converters, antennas, hardware decoders and encoders, graphic processors, a universal integrated circuit card (UICC) or an embedded UICC (eUICC), and/or the like that enable the secure endpoint device 200 to execute applications and provide telecommunication and data communication functions.

The one or more processors 208 and the memory 210 of the secure endpoint device 200 may implement an operating system 214, device software 216, one or more applications 218, and the secure endpoint application 118. Such software may include routines, program instructions, objects, and/or data structures that are executed by the processors 208 to perform particular tasks or implement particular abstract data types.

The operating system 214 may include components that enable the secure endpoint device 200 to receive and transmit data via various interfaces (e.g., user controls, communication interface 202, and/or memory input/output devices). The operating system 214 may also process data using the one or more processors 208 to generate output based on input that is received via the user interface 206. For example, the operating system 214 may provide an execution environment for the execution of the applications 218. The operating system 214 may include a presentation component that presents the output (e.g., display the data on an electronic display, store the data in memory, transmit the data to another secure endpoint device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the secure endpoint device 200 to perform functions. For example, the device software 216 may include basic input/output system (BIOS), boot-rom, or a bootloader that boots up the secure endpoint device 200 and executes the operating system 214 following the powerup of the device.

The applications 218 may include applications that provide utility, entertainment, and/or productivity functionalities to a user of the secure endpoint device 200. For example, the applications 218 may include telephony applications, electronic mail applications, remote desktop applications, web browser applications, navigation applications, office productivity applications, multimedia streaming applications, an online shopping application, and/or so forth.

The secure endpoint application 118 may include a data policy module 220, a data notation module 222, a data security module 224, a data access module 226, a data encryption module 228, a data transport module 230, and a distributed ledger module 232. In some embodiments, the secure endpoint application 118 may be executed by a trusted environment of the secure endpoint device 200. The trusted environment is an isolated execution space that is provided by dedicated software and/or hardware of a device. For example, the trusted environment may employ a dedicated memory space or memory chip that is not accessible by applications and/or hardware components not located in the dedicated memory space or memory chip, unless such applications and/or hardware components are provided with special access privileges through secure communication channels and APIs. In alternative instances, the applications that reside in the trusted environment may be executed by a dedicated processor. The isolation of the trusted environment provides a high level of security for the execution of code or the processing of data stored in the execution space. The trusted environment may further provide a secure data store for the storage of data files on the secure endpoint device 200.

The data policy module 220 may receive a data protection policy from the data protection engine 116. In various embodiments, the data protection engine 116 may use various transfer protocols to send the data protection policy to the secure endpoint application 118, such as Secure Copy Protocol (SCP), Secure File Transfer Protocol (SFTP), HTTP Secure (HTTPS), and/or so forth. Subsequently, the secure endpoint application 118 may periodically poll the data protection engine 116 for updates to the data protection policy. Alternatively, or concurrently, the data protection engine 116 may push updated versions of the data protection policy to the secure endpoint application 118.

The data notation module 222 may apply the data protection policy to mark the data files that are generated by the secure endpoint device 200 with metadata. For example, in a scenario in which the secure endpoint device 200 is a video camera, the data file may include a constant stream of the video content. Likewise, in a scenario in which the secure endpoint device 200 is a personal fitness monitoring device, the data file may include a constant stream of user biometric data. Each data file that is generated by the secure endpoint device 200 may be marked with an ownership identifier, a data sensitivity level, and/or so forth in accordance with the data protection policy. In some instances, the data protection policy may mandate that a data file is to self-encrypt after a specific time period. In such an instance, the data notation module 222 may append an encryption algorithm and an encryption key to the data file, in which the encryption algorithm automatically renders the encryption key irretrievable following the encryption of the data file. The encryption algorithm may render the encryption key irretrievable by a deletion of the encryption key from the memory 210 or further encrypting the encryption key with an additional one-time use encryption key.

The data security module 224 may use the data access restriction rules in the data protection policy to determine whether a data file is permitted to be sent to another device of the secure LAN 112. In some embodiments, the data security module 224 may receive or intercept a request for a data file, in which the request is sent by an application on a particular secure endpoint device. In turn, the data security module 224 may send an access privilege query to the secure endpoint application 118 on the particular secure endpoint device. The query is used to request information on the specific data sensitivity levels and data ownership of the data files that the particular secure endpoint device is permitted to access. Accordingly, the data security module 224 may grant the data transport module 230 permission to send the requested data file to the particular user device when the data sensitivity level and the ownership identifier of the data file matches the permitted access privileges of the particular user device. Further, the data security module 224 may use the data access restriction rules in the data protection policy to determine whether the secure endpoint device 200 is permitted to receive a data file from another user device. In such instances, the data security module 224 may determine whether the ownership identifier and sensitivity level information embedded in the data file matches a permitted sensitivity level and ownership settings of the secure endpoint device 200. If such a match is found, the data security module 224 may permit the other applications on the secure endpoint device 200 to access the data file. Otherwise, the data security module 224 may perform a virtual deletion of the data file. The virtual deletion may be accomplished by activating the data encryption module 228 to encrypt the data file with an encryption key that is made irretrievable after encryption. The data security module 224 may render the encryption key irretrievable by a deletion of the encryption key or by further encrypting the encryption key with an additional one-time use encryption key.

The data access module 226 may provide data file access functionalities. In various embodiments, such functionalities may include a data content viewing function, a media streaming function, a data content editing function, a data content printing function, a data file organization function, a data file deletion function, and/or so forth. In other embodiments, the data access module 226 may call other applications installed on the secure endpoint device 200 to perform such functionalities with respect to the data files.

The data encryption module 228 may encrypt the data files that are generated by the secure endpoint device 200 according to an encryption level specified in the data protection policy prior to delivery to other secure endpoint devices. For example, a higher encryption level may be achieved by using a longer encryption key. Conversely, a lower encryption level may be performed by using a shorter encryption key. Accordingly, the data encryption module 228 may be populated with multiple encryption keys of different key lengths by the data protection engine 116. The keys may include asymmetric encryption keys or symmetric keys that are shared between secure endpoint devices of the secure LAN 112. In some embodiments, the encryption may be implemented using various asymmetric and symmetric encryption techniques such as public key infrastructure (PKI) key negotiation and encryption, Diffie-Hellman key exchange, and/or so forth. Likewise, the data encryption module 228 may decrypt data files that are received from other devices in the secure LAN 112.

The data transport module 230 may use the APN included in a data protection policy to send and receive data files via a network gateway that is designated by the APN. In this way, the data files may be sent and received via a network slice that corresponds to the APN. For example, the IP data packets that are transported by the data transport module 230 may be labeled with the APN of the network slice, an identifier of the secure endpoint device (e.g., IMEI), and/or other identification information that ensures the appropriate routing of the data files by the network gateway. In instances in which the secure endpoint device 200 is the hub device 110, the data transport module 230 may enable the secure endpoint device 200 to exchange data with legacy devices, such as the legacy devices 132(1)-132(K). In various embodiments, the data transport module 230 may provide a user interface menu that enables a user to connect the secure endpoint device 200 to a legacy device via an unlicensed communication link, such as Wi-Fi, Bluetooth, and/or so forth. Subsequently, the data transport module 230 may exchange data with legacy devices. However, the data transport module 230 may use a software firewall and/or a hardware firewall to prevent the legacy device from requesting access to data stored on the other devices in the secure LAN 112.

The distributed ledger module 232 may provide functions that enable the secure endpoint device 200 to act as a node of the decentralized distributed ledger. In various embodiments, the distributed ledger module 232 may record the data file transaction events for a data file in the decentralized distributed ledger. These events may include a creation of the data, a transfer of the data file, an encryption of the data file, a decryption of the data file, a modification of the data file, a storage of the data file, a duplication of the data file, an access of the data file, a deletion of the data file, and/or so forth. Each transaction event record may include information such as a transaction identifier, a date and time of the transaction, an identifier of the transaction that is executed, the identifier for each of the one or more devices involved in the transaction, an identifier of the software used to perform the transaction, a result of the transaction (e.g., success, failure, retry, etc.) and/or so forth.

Example Computing Node Components

Figure 3:
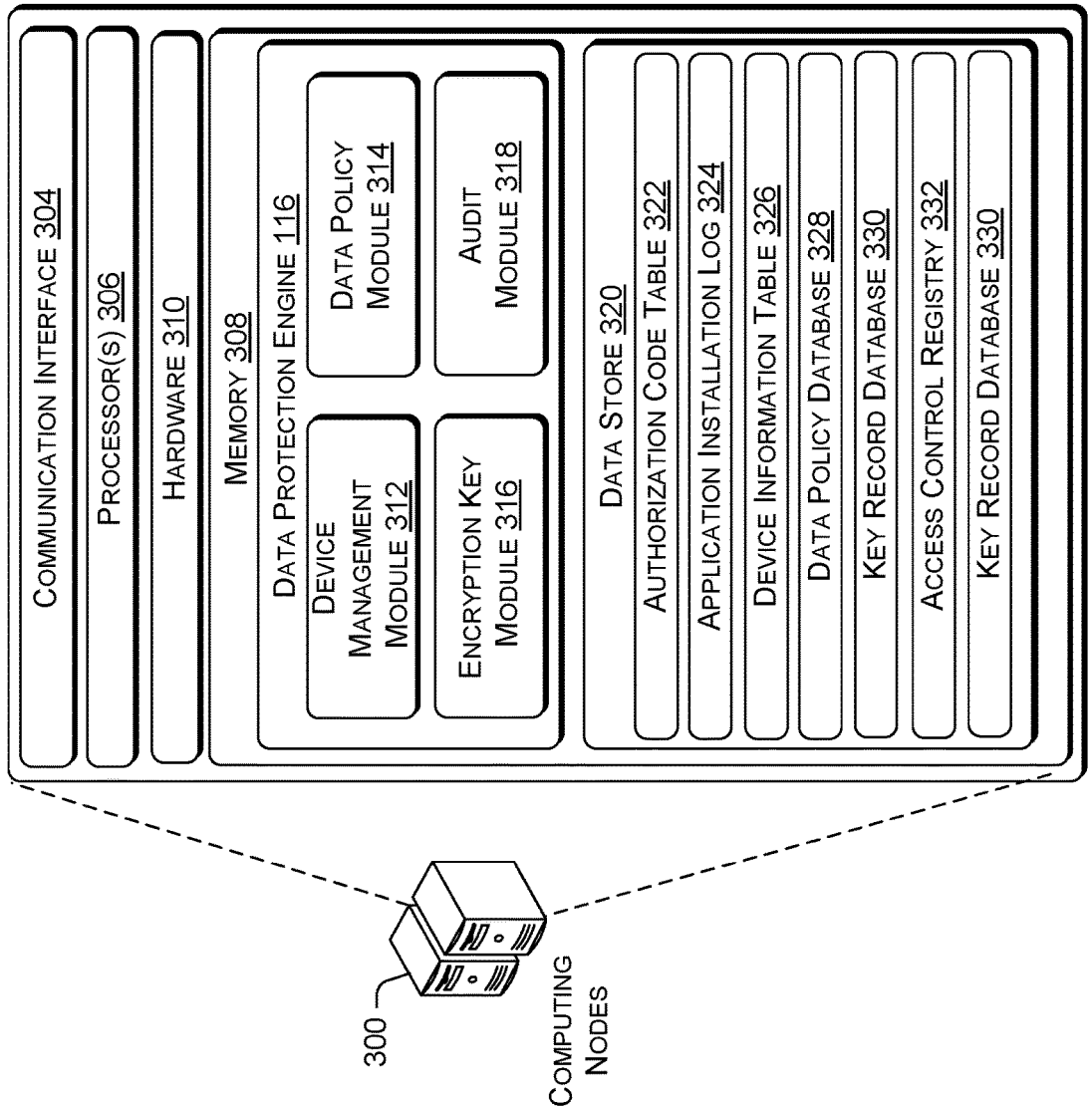
FIG. 3 is a block diagram showing various components of one or more illustrative computing nodes that implement a data protection engine of a wireless carrier network for protecting sensitive user data.

FIG. 3 is a block diagram showing various components of one or more illustrative computing nodes that implement a data protection engine of a wireless carrier network for protecting sensitive user data. The data protection engine 116 may be implemented by the computing nodes 300. The computing nodes 300 may include a communication interface 304, one or more processors 306, and memory 308. The communication interface 304 may include wireless and/or wired communication components that enable the one or more computing nodes 300 to transmit data to and receive data from other networked devices. The computing nodes 300 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The data protection engine 116 may be stored in the memory 308. The data protection engine 116 may include a device management module 312, a data policy module 314, an encryption key module 316, and an audit module 318. The modules may include routines, program instructions, objects, and/or data structures that perform particular tasks or implement particular abstract data types. The memory 308 may be further configured to implement a data store 320.

The device management module 312 may receive a registration request from a user device to register as a secure endpoint device. The registration request may include a device identifier of the user device, a network identifier of a secure LAN that the user device has selected to join (e.g., secure LAN 112), an authorization code, and/or so forth. The device management module 312 may verify the authorization code against an authorization code table 322 to determine whether the user device is authorized to join the secure LAN. For example, an operator of the wireless carrier network 102 may have previously distributed a list of authorization codes to the enterprise that desires to establish the secure LAN. Accordingly, the list of authorization codes may be stored in the authorization code table 322 as corresponding to the network identifier of the secure LAN. Following verification that the user device is permitted to join the secure LAN, the device management module 312 may check the device identifier against an application installation log 324 to determine whether the user device has a secure endpoint application (e.g., secure endpoint application 118) installed. The application installation log 324 may include device identifiers of user devices that have installed secure endpoint applications, date and time of installation on each user device, software version information of the application installed on each user device, and/or other relevant information.

Alternatively, or concurrently, the device management module 312 may send a query command to the secure endpoint application on the user device. If the secure endpoint application is installed on the user device, the secure endpoint application may respond with software version information of the application. Thus, the device management module 312 may use one or more of these information sources to determine the secure endpoint application status of the user device. If the device management module 312 determines that the user device lacks a secure endpoint application or has an outdated version of the secure point application, the device management module 312 may initiate a download and installation of the latest version of the secure point application on the user device. For example, the download may be performed via an HTTPS download mechanism, an FTP download mechanism, or some equivalent download mechanism. The secure point application may be packaged in an installation file that installs the secure point application on the user device.

Following installation or verification of installation for a secure point application on a user device, the device management module 312 may send a data protection policy that corresponds to the user identifier of the user device to the device. In various embodiments, the device management module 312 may use a device information table 326 to identify a device type of the user device based on the device identifier of the device. Subsequently, the device management module 312 may retrieve a device protection policy that corresponds to the device type from a data policy database 328 according to a data policy assignment table and push the policy to the secure endpoint application on the user device. The device management module 312 may further assign a network slice to the user device. For example, the device identifier of the user device may be added to an access control registry 332 that is used by the corresponding network gateway of the APN associated with the network slice.

The data policy module 314 may provide an online portal that enables administrators to upload or modify data protection policies for different device types of multiple secure LANs. For example, the online portal may be accessed via a dashboard website or a client application on a remote user device. In various embodiments, a data protection policy may be a policy that is developed by the MNO for the customer, a policy that is developed by the customer and uploaded to the data policy database, or a policy that is jointly developed by the MNO and the customer. In various embodiments, the data protection policy may include an Access Point Name (APN) of a network gateway for the network slice that is assigned to the recipient user device.

The data policy module 314 may store an inputted data protection policy in the data policy database 328. In some embodiments, when an updated data protection policy for a device type is uploaded to the data policy database 328, the data policy module 314 may trigger the device management module 312 to push the update data protection policy to all affected devices.

The encryption key module 316 may distribute encryption keys to the user devices that are registered with the device management module 312. In various embodiments, the encryption keys may include symmetric keys or asymmetric key pairs. The encryption key module 316 may maintain a key record database 330 that stores the encryption keys distributed to the user devices. The key record database 330 may contain metadata that records, for each encryption key, a corresponding device identifier of a user device, time and date of distribution, the device type of the user device, the network identifier of the secure LAN associated with the user device, and/or so forth. In some embodiments, the encryption key module 316 may embed the keys into an installation file for the secure endpoint application for distribution by the device management module 312. In other embodiments, the encryption key module 316 may activate the device management module 312 to distribute the encryption keys to a user device along with the distribution of a data protection policy.

The audit module 318 may receive requests for accessing data transaction records in the decentralized distributed ledger for data files that are stored in a secure LAN, such as the secure LAN 112. In various embodiments, a user making a request may submit login credentials using an application (e.g., a web browser) on a user device. The login credentials may include a user identifier, a user password, user biometric data, and/or so forth. In turn, audit module 318 may use an authentication database to verify the login credentials of the user. For example, the authentication database may store the login credentials of authorized users, in which the users are provided with access to data transaction records associated with each secure LAN. Accordingly, the audit module 318 may ensure that a request is from an authorized user prior to granting the request. The data transaction records may be accessed by authorized users for audit, monitoring, and/or tracking purposes.

In some embodiments, a person whose information is stored in one or more data files may submit a request via an online portal (e.g., a website) provided by the audit module 318 to delete every data file that contains the information of the user. In such embodiments, an authorized user may review the received request and make modifications (e.g., a redaction of content from a data file, a deletion of a data file, etc.) to purge the information of the person. Subsequently, the authorized user may use the audit module 318 to produce data transaction records that show that the information of the person has been properly purged from the data stores of the secure LAN. In at least one embodiment, the audit module 318 may provide a way for an authorized party to retrieve a data file that is deleted. As described above, the virtual deletion of a data file is performed by a secure endpoint application via the encryption of the data file with an encryption key that is then subsequently deleted from a memory of the device executing the secure endpoint application. However, the encryption keys that are used by the secure endpoint applications are assigned by the encryption key module 316 and stored in the key record database 330. Thus, the audit module 318 may have the ability to undelete a data file by decrypting the virtually deleted data file with a corresponding encryption key under the direction of an authorized user. However, the authorized user is only permitted to activate such an undelete function in limited instances, such as when compelled to do so by a lawful order of a government entity, upon a request of a person for whom the deletion was initially performed, upon a request from a legal representative or an heir of the person, etc.

Example Processes

FIGS. 4-8 present illustrative processes 400-800 that may be implemented by a wireless carrier network to protect sensitive user data while providing network slicing to network devices. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 4:
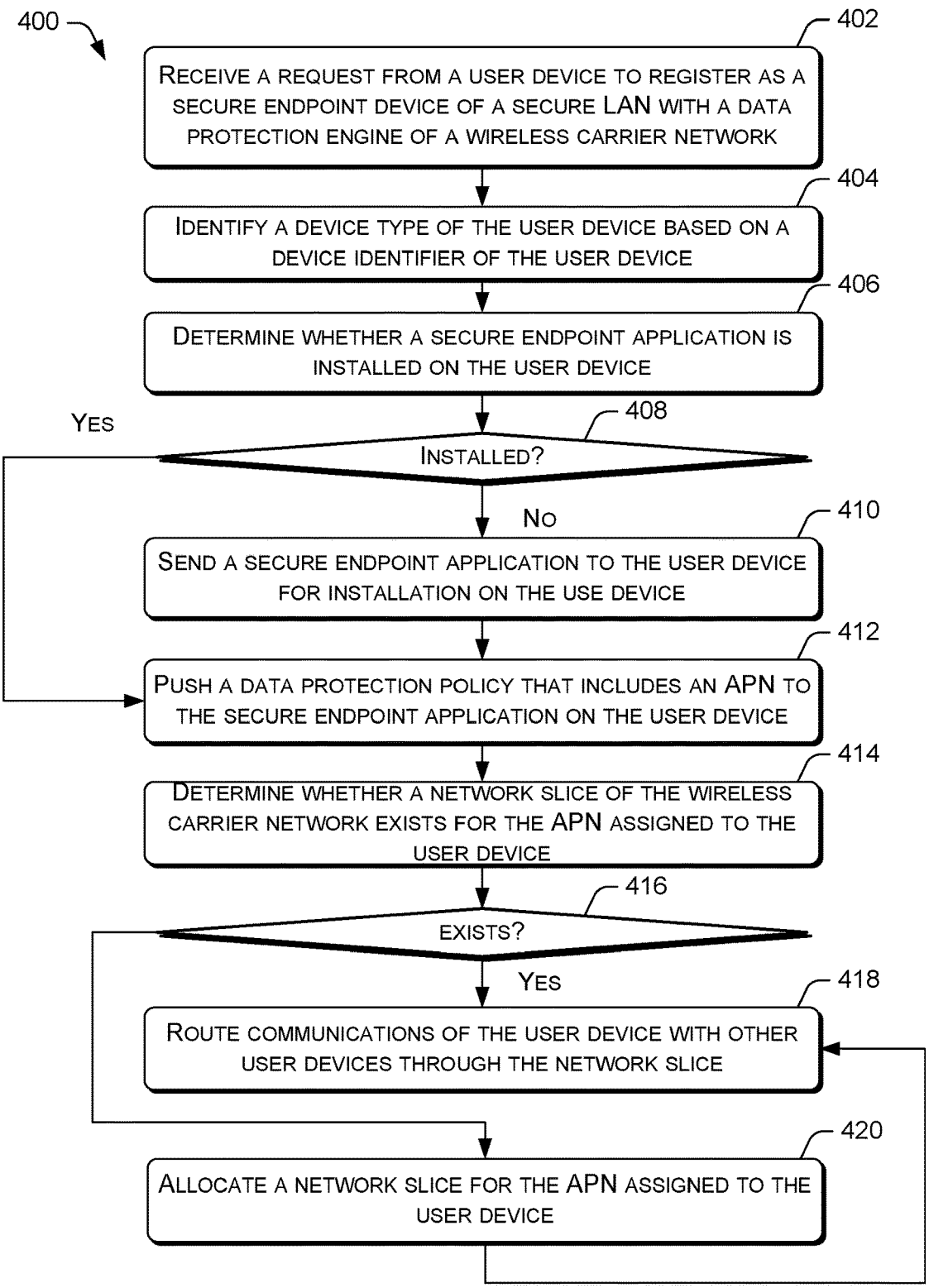
FIG. 4 is a flow diagram of an example process for registering a secure endpoint device as a secure endpoint device and routing the communications of the secure endpoint device through an allocated network slice.

FIG. 4 is a flow diagram of an example process 400 for registering a user device as a secure endpoint device and routing the communications of the secure endpoint device through an allocated network slice. At block 402, the data protection engine 116 of the wireless carrier network 102 may receive a request from a user device to register as a secure endpoint device of a secure LAN. In various embodiments, the user device may send the registration request in response to a user activating the user device to contact an online portal of the data protection engine 116. The online portal may be accessed by sending the registration request to a website or an Internet Protocol (IP) address.

At block 404, the data protection engine 116 may identify a device type of the user device based on a device identifier of the user device. In various embodiments, the device identifier may be included in the registration request from the user device. In turn, the data protection engine 116 may compare the device identifier with a device identifier database to determine a device type of the user device. For example, the device type may indicate that the IoT device 106 is a medical device, a personal fitness tracker device, a home smart sensor device, etc. Accordingly, because the device type of the user device appears in the device identifier database, the data protection engine 116 may register the user device as a secure endpoint device.

At block 406, the data protection engine 116 may determine whether a secure endpoint application is installed on the user device. In some embodiments, the data protection engine 116 may check the device identifier of the user device against an application installation log for the installation status. In other embodiments, the data protection engine 116 may send a query command to the secure endpoint application on the user device for the installation status. At decision block 408, if the data protection engine 116 determines that the secure endpoint application is installed on the user device, the process 400 may proceed to block 410. At block 410, the data protection engine 116 may send a secure endpoint application to the user device for installation on the user device.

At block 412, the data protection engine 116 may push a data protection policy that includes an APN to the secure endpoint application on the user device. In various embodiments, the data protection policy may be a policy that is developed by a customer of the MNO who deployed the user device, by the MNO of the wireless carrier network 102 for the customer, or jointly developed by the customer and the MNO.

At block 414, the data protection engine 116 may determine whether a network slice of the wireless carrier network 102 exists for the APN assigned to the user device. At decision block 416, if the data protection engine 116 determines that the network slice exists, the process 400 may proceed to block 418. At block 418, the data protection engine 116 may route communications of the user device with other user devices through the network slice. In various embodiments, the network slice may meet certain predetermined data transport priority and security parameters. For example, the infrastructure components of the wireless carrier network 102 that are associated with the network slice may provide data security services for the data transported by the network slice. Such data security services may include malware detection, virus detection, botnet traffic detection, DoS attack detection, and/or so forth.

However, if the data protection engine 116 determines at decision block 416 that the network slice does not exist, the process 400 may proceed to block 420. At block 420, the data protection engine 116 may allocate the network slice for the APN assigned to the user device. Returning to decision block 408, if the data protection engine 116 determines that the secure endpoint application is installed on the user device, the process 400 may proceed directly to block 412.

Figure 5:
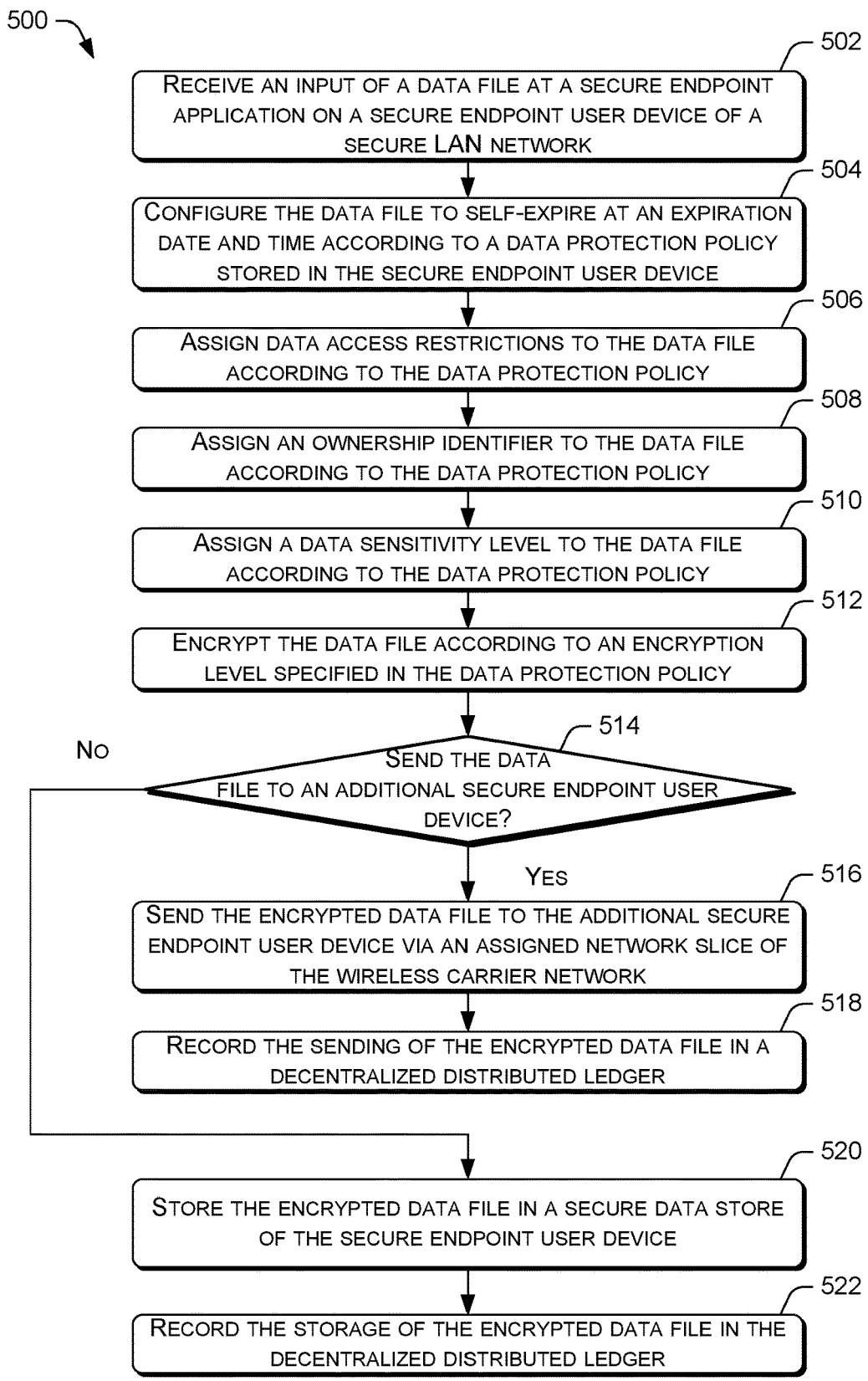
FIG. 5 is a flow diagram of an example process for protecting a data file that is received at a secure endpoint device according to a data protection policy.

FIG. 5 is a flow diagram of an example process 500 for protecting a data file that is received at a secure endpoint device according to a data protection policy. At block 502, a secure endpoint device of a secure LAN may receive an input of a data file at a secure endpoint application. In some embodiments, the data file may include data that is manually inputted by a user of the secure endpoint device. In other embodiments, the data file may include data that is generated and/or detected by one or more sensors of the secure endpoint device. For example, a secure endpoint device in the form of a biometric monitoring device may generate a data file that includes biometric data of the user.

At block 504, a secure endpoint application on the user device may configure the data file to self-encrypt at an expiration date and time according to a data protection policy stored in the secure endpoint device. In various embodiments, the self-deletion may occur when an encryption algorithm embedded in the data file encrypts the data file with an embedded encryption key that is then rendered irretrievable.

At block 506, the secure endpoint application may assign data access restrictions to the data file according to the data protection policy. In some instances, the data access restrictions may specify device parameters, e.g., the types and/or identifiers of devices to which the secure endpoint device is authorized to send data files. Alternatively, or concurrently, the data access restrictions may specify the types and/or identifiers of devices from which the secure endpoint device is authorized to receive data files. In other instances, the data access restrictions may specify that the secure endpoint device is only authorized to send data files with one or more particular ownership identifiers specified in an outgoing authorization list to other devices. Alternatively, or currently, the data access restrictions may specify that the secure endpoint device is authorized to receive data files with one or more specific ownership identifiers specified in an incoming authorization list from other devices. In other instances, the data access restrictions may specify a maximum sensitivity level for data files that the secure endpoint device is authorized to receive from other devices. Alternatively, or concurrently, the data access restrictions may specify that the secure endpoint device is only authorized to send data files having data sensitivity levels that are at or below a maximum sensitivity level to other devices.

At block 508, the secure endpoint application may assign an ownership identifier to the data file according to the data protection policy. For example, a secure endpoint device that is a part of a secure LAN that is operated by a particular entity may be required to label each data file generated by the IoT device with an ownership identifier of the particular entity.

At block 510, the secure endpoint application may assign a data sensitivity level to the data file according to the data protection policy. In various embodiments, the assigned data sensitivity level may determine whether other secure endpoint devices have permission to access the data file. At block 512, the secure endpoint application may encrypt the data file according to an encryption level specified in the data protection policy. For example, a higher encryption level may be achieved by using a longer encryption key. Conversely, a lower encryption level may be performed using a shorter encryption key.

At decision block 514, the secure endpoint application may determine whether to send the data file to an additional secure endpoint device. In various embodiments, this decision may be made based on a user inputted configuration setting for the secure endpoint application. Thus, if the secure endpoint application is to send the data file ("yes" at decision block 514), the process 500 may proceed to block 516. At block 516, the secure endpoint application may send the encrypted data file to the additional secure endpoint device via an assigned network slice of the wireless carrier network 102. At block 518, the secure endpoint application may record the sending of the encrypted data files in a decentralized distributed ledger.

Returning to decision block 514, if the secure endpoint application is not to send the data file ("no" at decision block 514), the process 500 may proceed to block 520. At block 520, the secure endpoint application may store the encrypted data file in a secure data store of the secure endpoint device. At block 522, the secure endpoint application may record the storage of the encrypted data file in the decentralized distributed ledger.

Figure 6:
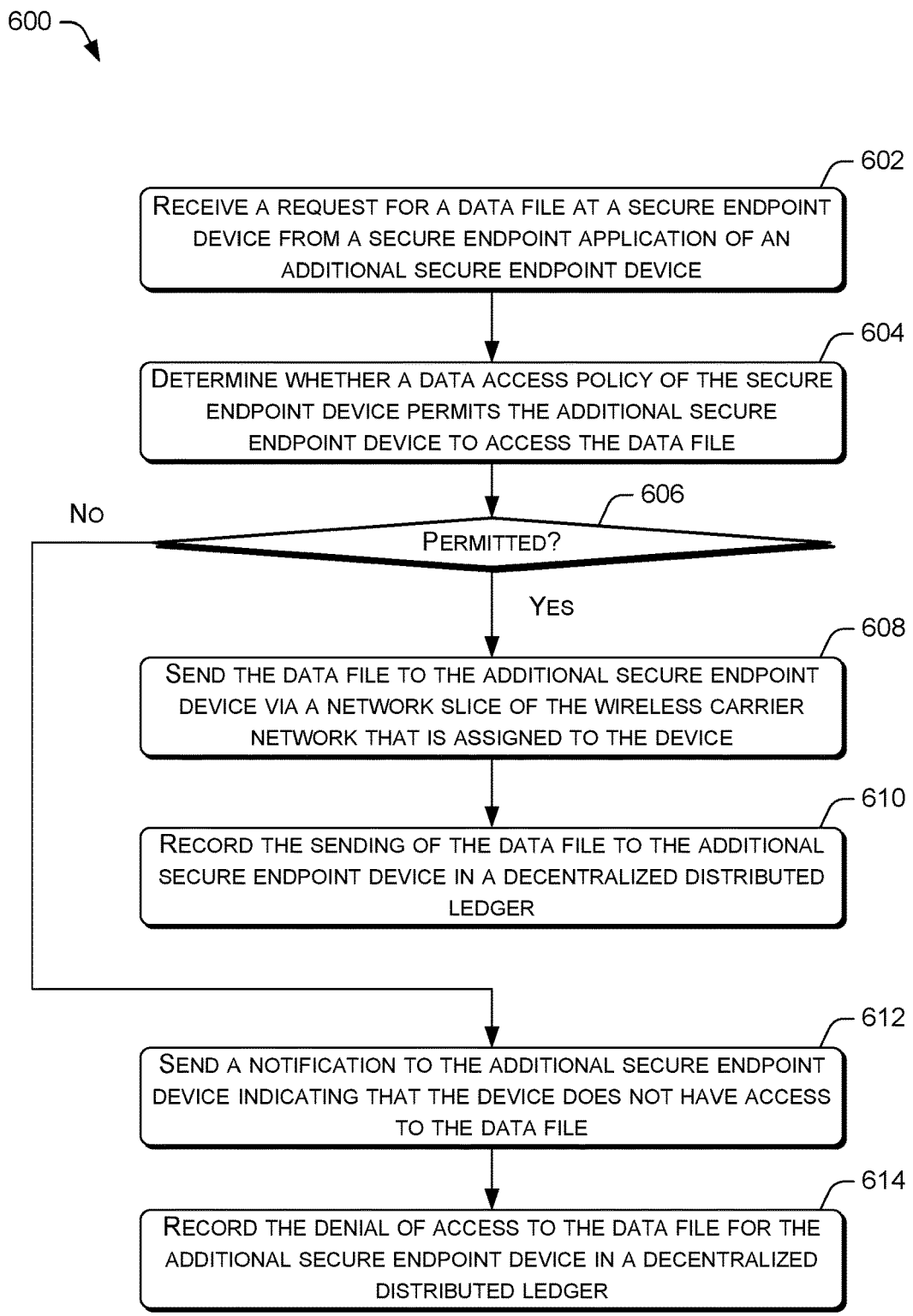
FIG. 6 is a flow diagram of an example process for a secure endpoint device to respond to a request for a data file that is stored in the secure endpoint device.

FIG. 6 is a flow diagram of an example process 600 for a secure endpoint device to respond to a request for a data file that is stored in the secure endpoint device. At block 602, a secure endpoint application on a secure endpoint device may receive a request for a data file from an additional secure endpoint application of an additional secure endpoint device. In various embodiments, the additional secure endpoint device may be requesting the data file in response to a user input or as a part of an automatic data retrieval configuration.

At block 604, the secure endpoint application may determine whether a data access policy of the secure endpoint device permits the additional secure endpoint device to access the data file. In various embodiments, the secure endpoint application may query the additional secure endpoint application to determine the ownership and sensitivity parameters of data files that the additional secure endpoint application is permitted to access. By comparing such parameters with the ownership and sensitivity level of the data file that is being requested, the secure endpoint application may determine whether the additional secure endpoint device is permitted to receive the data file.

At decision block 606, if the secure endpoint application determines that the additional secure endpoint device is permitted to access the data file ("yes" at decision block 606), the process 600 may proceed to block 608. At block 608, the secure endpoint application may send the data file to the additional secure endpoint device via a network slice of the wireless carrier network that is assigned to the device. In various embodiments, the secure endpoint application may use the network slice via an APN of a corresponding network gateway. At block 610, the secure endpoint application may record the sending of the encrypted data file to the additional user device in a decentralized distributed ledger.

Returning to decision block 606, if the secure endpoint application determines that the additional secure endpoint device is not permitted to access the data file ("no" at decision block 606), the process 600 may proceed to block 612. At block 612, the secure endpoint application may send a notification to the additional secure endpoint device indicating that the device does not have access to the data file. At block 614, the secure endpoint application may record the denial of access to the data file for the additional endpoint device in a decentralized distributed ledger.

Figure 7:
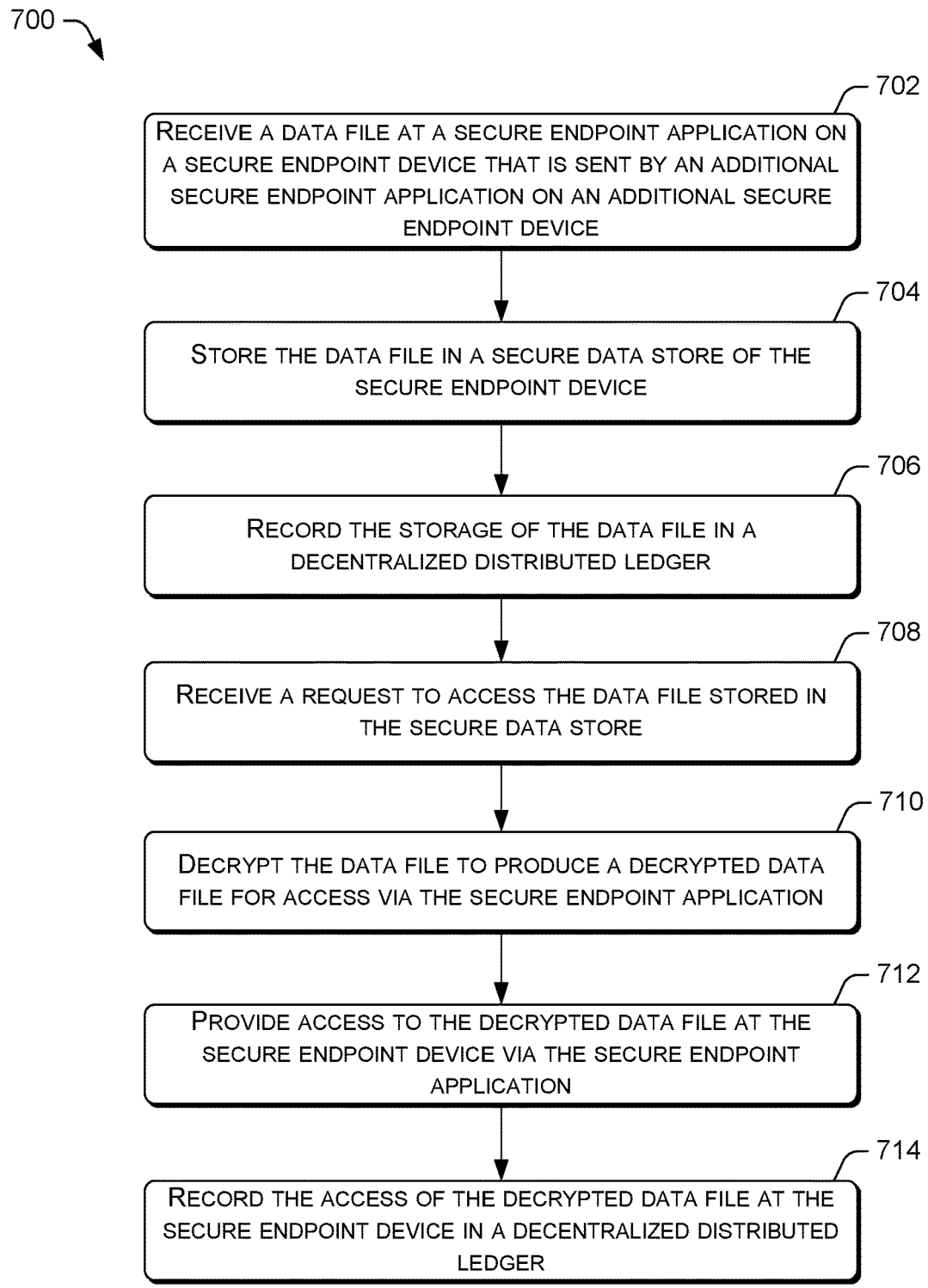
FIG. 7 is a flow diagram of an example process for a secure endpoint device that receives a data file to monitor and track access to the data file.

FIG. 7 is a flow diagram of an example process 700 for a secure endpoint device that receives a data file to monitor and track access to the data file. At block 702, the secure point application on a secure endpoint device may receive a data file that is sent by an additional secure endpoint application on an additional secure endpoint device. In various embodiments, the data file may be automatically sent by the additional secure endpoint application or sent by the additional secure endpoint application in response to a request from the secure endpoint application.

At block 704, the secure endpoint application may store the data file in a secure data store of the secure endpoint application. At block 706, the secure endpoint application may record the storage of the data file in a decentralized distributed ledger. At block 708, the secure endpoint application may receive a request to access the data file stored in the secure data store. For example, a user may input a request to view or stream the data file via a user interface menu provided by the secure endpoint application. At block 710, the secure endpoint application may decrypt the data file to produce a decrypted data file for access via the secure endpoint application. In one example, the data file may be decrypted using an encryption key that is used to encrypt the data file by the additional secure endpoint application. In another example in which the data file is originally encrypted by the additional secured endpoint application using a public key of an asymmetric public-private key pair, the data file may be decrypted using a private key of the key pair. At block 712, the secure endpoint application may provide access to the decrypted data file at the secure endpoint device via the secure endpoint application. For example, the secure endpoint application may present the data file on a display of the secure endpoint device. At block 714, the secure endpoint application may record the access of the decrypted data file at the secure endpoint device in a decentralized distributed ledger.

Figure 8:
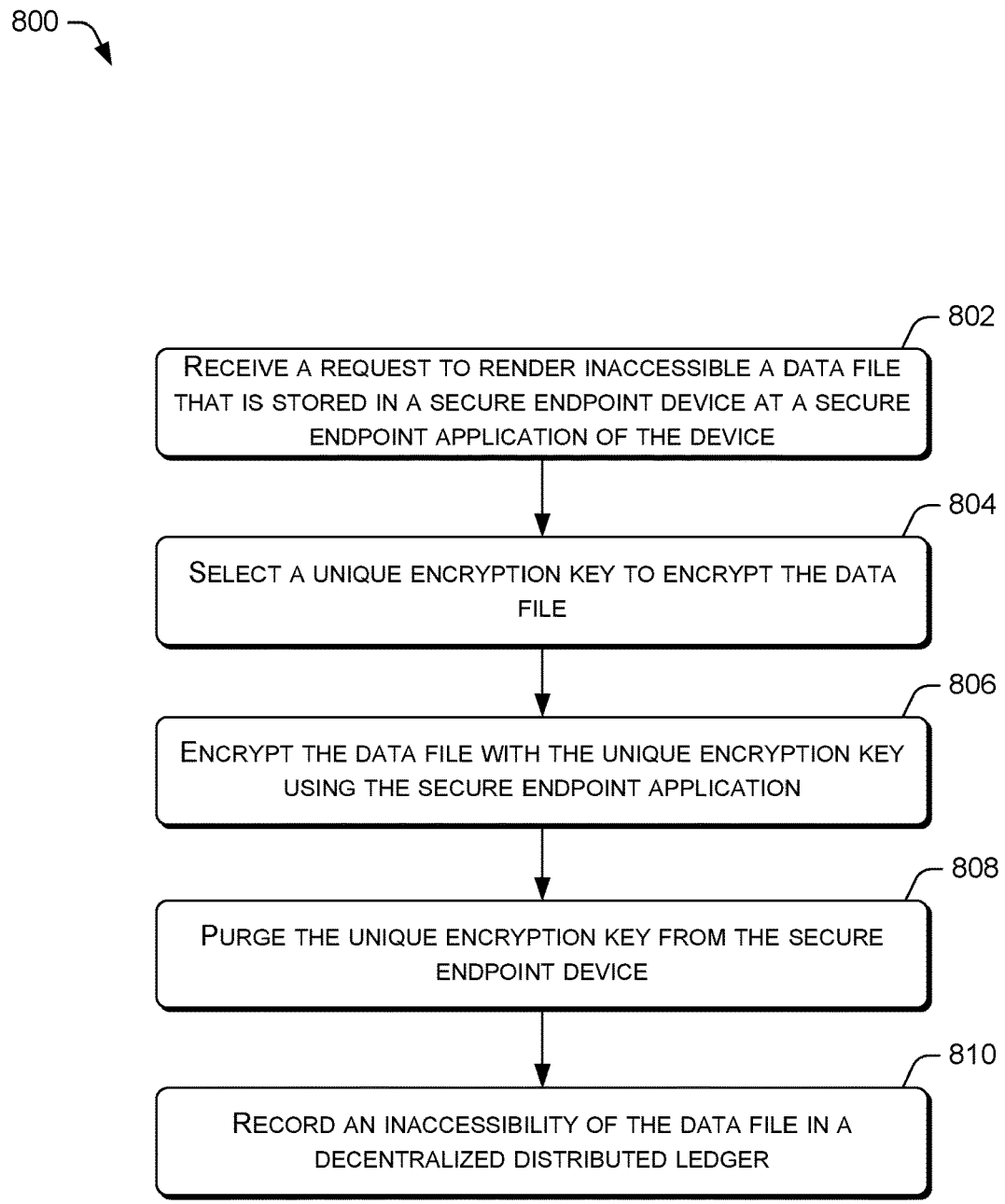
FIG. 8 is a flow diagram of an example process for a secure endpoint device to render inaccessible a data file that is stored in the secure endpoint device.

FIG. 8 is a flow diagram of an example process 800 for a secure endpoint device to render inaccessible a data file that is stored in the secure endpoint device. At block 802, a secure endpoint application on a secure endpoint device may receive a request to render inaccessible a data file that is stored in the secure endpoint device. For example, a user of the secure endpoint application may input a request to delete the data file via a user interface menu provided by the secure endpoint application. In another example, the request to delete the data file may have originated from the data protection engine 116 as a command to purge all data files related to a particular user from secure endpoint devices of a secure LAN.

At block 804, the secure endpoint application may select a unique encryption key to encrypt the data file. In various embodiments, the unique encryption key may be one of multiple encryption keys that the secure endpoint application received from the data protection engine 116 and stored in a secure data store of the secure endpoint device. At block 806, the secure endpoint application may encrypt the data file with the unique encryption key using the secure endpoint application.

At block 808, the secure endpoint application may purge the unique encryption key from the secure endpoint device. In various embodiments, the secure endpoint application may delete the unique encryption key from the secure data store of the secure endpoint device. In alternative embodiments, rather than deleting the unique encryption key, the secure endpoint application may encrypt the encryption key with another encryption key via a one-way encryption, so that the encryption key is irretrievable and cannot be used to decrypt the data file. At block 810, the secure endpoint application may record an inaccessibility of the data file in a decentralized distributed ledger. For example, the secure endpoint application may record a data transaction event that indicates that the data file has been deleted.

The techniques may enable an MNO to safeguard the integrity of data that are transported through the wireless carrier network, as well as provide an end-to-end solution that assists a customer with tracking and controlling the distribution of customer data at the network endpoints. In this way, rather than merely acting as a communication conduit for the data of customers, the MNO may play a key role in protecting the data from unauthorized access and use during the entire life cycle of the data.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of storing computer-executable instructions that upon execution cause one or more processors to perform acts comprising:
    receiving a request from a user device to register as a secure endpoint device of a secure local area network (LAN) that is provided by a wireless carrier network;
    identifying a device type of the user device based on device identification information provided by the user device;
    sending a data protection policy that corresponds to the device type of the user device to a secure endpoint application on the user device following a registration of the user device as a secure endpoint device, the data protection policy including an Access Point Name (APN);
    allocating a network slice of the wireless carrier network that corresponds to the APN to the user device, the network slice providing a communication channel for transporting a data file stored in the user device; and
    transporting the data file to an additional secure endpoint device via the network slice that is allocated to the user device,
    wherein the secure endpoint application is directed by the data protection policy to configure the data file to self-encrypt using an encryption key at an end of an expiration time period.

2. The one or more non-transitory computer-readable media of claim 1, wherein the network slice is a 5G network slice provided by the wireless carrier network.

3. The one or more non-transitory computer-readable media of claim 1, wherein the acts further comprise recording the transporting of the data file to the additional secure endpoint device in a decentralized distributed ledger via the secure endpoint application.

4. The one or more non-transitory computer-readable media of claim 1, wherein the acts further comprise providing the secure endpoint application to the user device for installation on the user device.

5. The one or more non-transitory computer-readable media of claim 1, wherein the acts further comprise encrypting the data file according to an encryption level specified by the data protection policy.

6. The one or more non-transitory computer-readable media of claim 1, wherein the secure LAN is implemented by an enterprise to replace one or more existing network infrastructure components of the enterprise.

7. The one or more non-transitory computer-readable media of claim 1, wherein the APN specifies a network gateway of a network infrastructure in the wireless carrier network that implements the network slice.

8. The one or more non-transitory computer-readable media of claim 1, wherein the data protection policy further specifies at least one of an ownership identifier, an encryption level, a data sensitivity level, and a data access restriction that is assigned by the secure endpoint application to the data file.

9. The one or more non-transitory computer-readable media of claim 8, wherein the data access restriction specifies one or more device parameters of secure endpoint devices that are permitted to access the data file.

10. The one or more non-transitory computer-readable media of claim 1, wherein the data protection policy further specifies at least one of a data sensitivity level or an ownership identifier of data files from another secure endpoint device that the secure endpoint application is permitted to access.

11. The one or more non-transitory computer-readable media of claim 1, wherein the data file is inputted by a user of the user device or generated by the user device.

12. A secure endpoint device, comprising:
    one or more processors; and
    memory including a plurality of computer-executable components that are executable by the one or more processors to perform a plurality of actions, the plurality of actions comprising:
        downloading a secure endpoint application and a data protection policy that includes an Access Point Name (APN) of a network slice of a wireless carrier network to the secure endpoint device, the data protection policy at least specifying types of user devices that are able to receive data from the secure endpoint device;

receiving, at the secure endpoint application, a request for a data file stored on the secure endpoint device, the request being initiated by an additional secure endpoint application on an additional secure endpoint device;

in response to determining based on the data protection policy that the additional secure endpoint device is permitted to access the data file:

sending the data file to the additional secure endpoint application via the network slice of the wireless carrier network assigned to the secure endpoint device;

recording the sending of the data file in a decentralized distributed ledger via the secure endpoint application; and configuring the data file to self-expire at an expiration date and time according to the data protection policy by self-encrypting the data file using an encryption key at the expiration date and time.

13. The secure endpoint device of claim 12, wherein the data file is inputted by a user of the secure endpoint device or generated by the secure endpoint device.

14. The secure endpoint device of claim 12, wherein the actions further comprise at least one of:

assigning a data access restriction to the data according to the data protection policy;

assigning an ownership identifier to the data file according to the data protection policy;

assigning a data sensitivity level to the data file according to the data protection policy; and encrypting the data file according to an encryption level specified in the data protection policy.

15. The secure endpoint device of claim 12, wherein the actions further comprise:

receiving an additional data file from another secure endpoint device via the secure endpoint application; and recording the receiving of the additional data file at the secure endpoint application in a decentralized distributed ledger.

16. The secure endpoint device of claim 12, wherein the actions further comprise:

receiving a request to access an additional data file that is received from another secure endpoint device at the secure endpoint application;

decrypting the additional data file to produce a decrypted data file for access via the secure endpoint application;

providing access to the decrypted data file at the secure endpoint device via the secure endpoint application; and recording access of the decrypted data file at the secure endpoint device in a decentralized distributed ledger via the secure endpoint application.

17. The secure endpoint device of claim 12, wherein the actions further comprise:

receiving a request to render inaccessible the data file that is stored in the secure endpoint device;

encrypting the data file with a unique encryption key from a data store using the secure endpoint application;

purging the unique encryption key from the data store used by the secure endpoint application or further encrypting the unique encryption key with an additional encryption key to render the unique encryption key irretrievable; and recording an inaccessibility of the data file in a decentralized distributed ledger.

18. A computer-implemented method, comprising:

receiving, at wireless carrier network, a request from a user device to register as a secure endpoint device of a secure local area network (LAN) that is provided by a wireless carrier network;

identifying, via the wireless carrier network, a device type of the user device based on device identification information provided by the user device;

sending, via the wireless carrier network, a data protection policy that corresponds to the device type of the user device to a secure endpoint application on the user device following a registration of the user device as a secure endpoint device, the data protection policy including an Access Point Name (APN);

allocating, via the wireless carrier network, a network slice of the wireless carrier network that corresponds to the APN to the user device, the network slice providing a communication channel for transporting a data file to the user device; and transporting, via the wireless carrier network, a data file from an additional secure endpoint device to the user device using the network slice that is allocated to the user device, wherein the secure endpoint application is directed by the data protection policy to configure the data file to self-encrypt using an encryption key at an end of an expiration time period.

19. The computer-implemented method of claim 18, further comprising performing data transactions for the data file that includes at least one of storing the data file in a secure data store of the user device, decrypting the data file into a decrypted data file, providing access to the decrypted data file, sending the data file to another secure endpoint device using the network slice, modifying the decrypted data file, or rendering the decrypted data file inaccessible, and storing a data transaction record for each data transaction of the data file in a decentralized distributed ledger.

20. The computer-implemented method of claim 19, further comprising retrieving a data transaction record of a data transaction in response to an audit request for the decentralized distributed ledger or a request for one or more data transaction records of the data file.

* * * * *